United States Patent [19]
Suzuki et al.

[11] Patent Number: 5,892,912
[45] Date of Patent: Apr. 6, 1999

[54] METHOD OF MANAGING VIRTUAL NETWORKS USING A VIRTUAL NETWORK IDENTIFIER

[75] Inventors: Atsuhiko Suzuki; Masanori Horiguchi, both of Hiratsuka, Japan

[73] Assignee: The Furukawa Electric Co., Ltd., Tokyo, Japan

[21] Appl. No.: 739,435

[22] Filed: Oct. 29, 1996

[30] Foreign Application Priority Data

Nov. 2, 1995 [JP] Japan ................................ 7-286227

[51] Int. Cl.$^6$ ................................................ G06F 13/00
[52] U.S. Cl. ................................................ 395/200.48
[58] Field of Search ................ 364/DIG. 1, DIG. 2; 370/254, 396, 404, 402; 395/500, 200.3, 200.43, 200.47, 200.48, 200.51, 200.53, 200.68, 200.69

[56] References Cited

U.S. PATENT DOCUMENTS

| | | | |
|---|---|---|---|
| 5,394,402 | 2/1995 | Ross | 370/402 |
| 5,444,702 | 8/1995 | Burnett et al. | 370/254 |
| 5,600,644 | 2/1997 | Chang et al. | 370/404 |
| 5,633,869 | 5/1997 | Burnett et al. | 370/396 |

OTHER PUBLICATIONS

"Dash into Virtual LAN"; Nikkei Communications; No. 186, published Nov. 21, 1994; Japan.

*Primary Examiner*—Robert B. Harrell
*Attorney, Agent, or Firm*—Frishauf, Holtz, Goodman, Langer & Chick

[57] ABSTRACT

A method is provided for managing virtual networks wherein switching hubs, each having ports to which nodes are respectively connected and having a bridging function, are interconnected via an ATM network, and predetermined ones of the ports of the switching hubs are grouped in order to construct virtual LANs. Data from a source node is transmitted to nodes belonging to the same group as the source node. A VLAN server, which stores MAC addresses of these nodes and VLAN identifiers in association with each other, is connected to the ATM network and collectively manages all nodes by means of the MAC addresses. The switching hub makes an inquiry for a VLAN identifier, and reconstructs or modifies the VLAN in accordance with a VLAN identifier responded from the VLAN server.

14 Claims, 16 Drawing Sheets

FIG.5

| FRAME HEADER | IP HEADER | UDP HEADER | COMMAND IDENTIFIER (1 BYTE) | MAC ADDRESS (6 BYTES) | VLAN IDENTIFIER (32 BYTES) | SW-HUB IDENTIFIER (20 BYTES) | PORT NO. (1 BYTE) |

METHOD OF MANAGING VIRTUAL NETWORKS USING A VIRTUAL NETWORK IDENTIFIER

BACKGROUND OF THE INVENTION

1. Field of the Invention

This invention relates to a virtual network management method for managing virtual networks, for example, virtual LANs or the like, which are configured over a backbone network such as an ATM (Asynchronous Transfer Mode) network.

2. Description of the Related Art

In the case of using switching hubs as connecting devices connected to a high-speed network such as an ATM network, it is conventionally known to construct a plurality of separate LANs (virtual LANs) irrespective of physical configuration.

The configuration of a typical virtual LAN will be explained below. In the virtual LAN, a switching hub which is designed according to, for example, the standard ATM-IEEE 802.3 (hereinafter merely referred to as "switching hub") has an ATM interface for high-speed backbone. Utilizing LAN Emulation standardized by the ATM Forum, the switching hub transfers a packet structured according to the standard IEEE 802.3 (hereinafter merely referred to as "packet") to an ATM-side interface.

With LAN Emulation, it is possible to construct a plurality of different emulated LANs (hereinafter referred to as "ELANs"). Namely, according to LAN Emulation, software permits any one of switching hub ports which are designed in conformity with the standard IEEE 802.3 (hereinafter merely referred to as "ports") to be allocated to a desired ELAN. Consequently, a plurality of independent LANs (virtual LANs) can be constructed without reconfiguring physical wiring. A broadcast packet is inhibited from passing through different virtual LANs, and nodes belonging to different virtual LANs are isolated from one another and are unable to communicate directly.

In such virtual LANs, since the individual ports are allocated to different networks by means of software, there arises a difference between the physical wiring and the actual networks, making it difficult to grasp the network configuration. Also, it is unnecessary to reconfigure the hard wiring each time the networks are modified; however, when network modification is made by means of software, virtual LANs must be set manually with a thorough understanding of the hardware connections, requiring considerable time and labor for the settings.

Here let it be assumed that network wiring is installed, for example, in a building and that switching hubs are arranged on the individual floors of the building. The wiring for the switching hubs is extended above ceilings or behind walls and the individual ports are arranged in the form of sockets at predetermined locations on the floors. To each socket is connected a 10 Base-T type hub which in turn is wired to respective nodes in a group or department, followed by the setting of virtual LANs.

With such network wiring installed, there may arise a situation where the nodes of a department at a certain location on the second floor are moved to the first floor and connected to sockets of the switching hub on the first floor. In such a case, the virtual LAN setting for a conventional network system involves checking and setting the port number of the switching hub having sockets to which the nodes were newly connected. It is therefore necessary to grasp with accuracy the wiring relationship between the sockets and physical ports connected thereto.

In practice, however, it is difficult to keep a thorough understanding of the port numbers of the switching hubs in relation to the sockets connected thereto, inclusive of the wiring within the building. Especially in the case of a larger-scale network, the difficulty in the virtual LAN settings through the switching hubs increases for the above reason. If a setting error exists because of erroneous information about the port numbers, there is a possibility that a grave communication fault will occur in the network. Consequently, modification of the virtual LAN settings during operation of the network is always accompanied by great risks that can affect the LAN operation.

In view of the foregoing, there has conventionally been proposed a concept of relational LAN wherein packet protocols or network numbers are detected, and identical network protocols or identical network numbers are automatically allocated to the same virtual LAN, as described on pages 58–81 of *Nikkei Communications*, No. 186 (Nov. 21, 1994 issue, Japan). The relational LAN facilitates the reconstruction of virtual LANs according to identical protocols or identical network numbers as well as modification of the virtual LANs, thus making it possible to modify the virtual LANs while the network is in operation.

The concept of relational LAN involves the function of isolating networks with the same network number from one another or making different networks coexist on the same virtual LAN, the security function of excluding a network node that was added on purpose to cause a network fault, and other functions. When these functions are executed on the virtual LAN, however, calculations must be performed taking account of upper-layer frames and thus are complicated, entailing difficulty in achieving the functions. It is also necessary that all protocols such as IP (Internet Protocol) and IPX (Internet Packet eXchange) should be recognized and handled, requiring complicated operation.

SUMMARY OF THE INVENTION

This invention was created in view of the above circumstances, and an object thereof is to provide a virtual network management method which facilitates collective management of complicated virtual networks and also is capable of automatically reconstructing and modifying the virtual networks.

Another object of this invention is to facilitate data transfer based on the contents of data stored in a table, as well as modification of the contents of the table in accordance with a virtual network identifier responded from a virtual network server.

Still another object of this invention is to permit a server to collectively manage nodes connected to virtual networks.

A further object of this invention is to preserve consistency of data and also to permit reduction in scale of the system to thereby facilitate the system management.

The above objects are achieved by a virtual network management method according to this invention. In a system to which the virtual network management method of this invention is applied, switching hubs, each having ports to which nodes are respectively connected and having a bridging function, are interconnected via an ATM network. Predetermined ones of the ports of the switching hubs are grouped in order to construct virtual LANs (hereinafter referred to as "VLANs"), and data from a source node is transmitted to nodes belonging to the same group as the source node. Also connected to the ATM network is a virtual network server which stores MAC addresses of the nodes connected to the respective ports of the switching hubs and virtual network identifiers indicative of groups to which the individual nodes belong, in association with each other. A switching hub sends a frame including a MAC address of a node to the virtual network server in order to inquire for the virtual network identifier associated with the node. In accordance with the identifier responded from the virtual network server, the switching hub performs virtual network setting for the corresponding port, thereby automatically reconstructing or modifying the virtual networks.

Preferably, each of the switching hubs has a preset switching hub identifier distinguishable from those of the other switching hubs and preset port numbers associated with its respective ports, and is also provided with a table for storing the MAC addresses of the nodes, the port numbers of the ports to which the nodes are connected, and the virtual network identifiers in association with one another. Each switching hub performs data transfer in accordance with the contents of the table, and also modifies the contents of the table in accordance with a virtual network identifier responded from the virtual network server.

The virtual network server preferably stores the MAC addresses of the nodes, the virtual network identifiers, the switching hub identifiers of the switching hubs and the port numbers of the switching hubs, to which the nodes are connected, in association with one another.

Preferably, the ATM network includes a LAN Emulation server and a LAN Emulation configuration server for LAN Emulation. The LAN Emulation server and the LAN Emulation configuration server share the database of the virtual network server to preserve consistency of data, and the virtual network server complies with data retrieval requested by the LAN Emulation server or the LAN Emulation configuration server.

The switching hub searches its table for a virtual network identifier associated with a destination MAC address in a frame transmitted from a predetermined node, or searches its table for a virtual network identifier associated with a source MAC address in a frame transmitted to the predetermined node, and automatically recognizes the virtual network identifier of the predetermined node through learning.

The virtual network server changes a virtual network identifier associated with a specific one of the stored MAC addresses in accordance with a predetermined modification command, and transmits a modification notice frame indicative of the change of the virtual network identifier to the related switching hubs. When the modification notice frame is received, the switching hub automatically changes the virtual network identifier associated with the corresponding one of the MAC addresses in its table.

BRIEF DESCRIPTION OF THE DRAWINGS

FIG. 5 is a diagram showing the format of a frame used in this invention;

DETAILED DESCRIPTION OF THE PREFERRED EMBODIMENTS

A virtual network management method according to this invention will be hereinafter described with reference to FIGS. 1 through 17.

Figure 1:
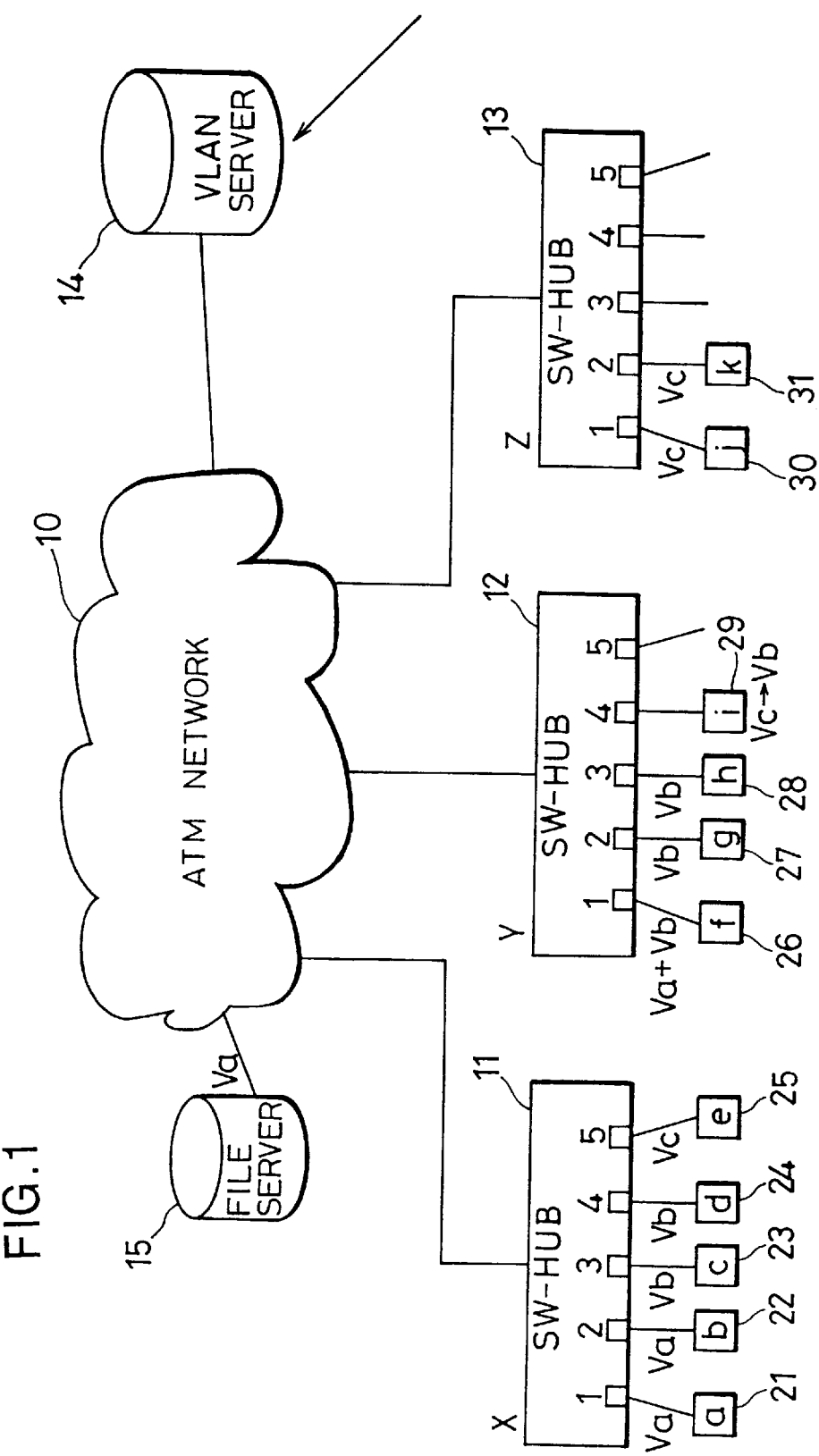
FIG. 1 is a diagram showing the configuration of a VLAN system using a virtual network management method according to one embodiment of this invention.

FIG. 1 illustrates the configuration of a VLAN system using a virtual network management method according to one embodiment of this invention.

Referring to FIG. 1, the VLAN system has a high-speed network, for example, an ATM network 10, as a backbone network, and a plurality of switching hubs 11, 12 and 13 are connected to respective branch lines of the ATM network 10.

The switching hubs 11, 12 and 13 are constructed with an ATM network-side port (not shown) connected to the ATM network 10, and IEEE 802.3 ports 1 to 5 connected to respective network nodes (hereinafter merely referred to as "nodes"). Each of these switching hubs provides a bridging connection of MAC layer level between its ports 1 to 5, as well as between its ports and the ATM network-side ports of other switching hubs.

Also connected to the ATM network 10 are a VLAN server 14 and a file server 15. These servers 14 and 15 provide resources to the individual switching hubs 11, 12 and 13. The VLAN server 14 stores MAC addresses of the nodes etc. connected to the ports of the individual switching hubs 11, 12 and 13, and VLAN identifiers specifying groups to which the respective nodes etc. belong. The file server 15 stores document or data files. Each of the servers 14 and 15 also is a node having a communication function, like the other nodes, and has a MAC address associated therewith and a VLAN identifier specifying a group(s) to which it belongs.

The description below is based on the assumption that the procedure for conversion between an IEEE 802.3 frame and a frame on the ATM network, the method of handling a VCC (Virtual Channel Code) identifier specifying a target of connection on the ATM network 10, the broadcasting method, etc., are all in conformity with the LAN Emulation v. 1.0 (specification that allows the use of existing LAN resources in an ATM environment) based on the ATM Forum. Accordingly, an LES (LAN Emulation Server), a BUS (Broadcast Unknown Server), and an LECS (LAN Emulation Configuration Server) are connected to respective ATM nodes, though not shown in the figure.

Each of the switching hubs 11, 12 and 13 has a VLAN function and permits individual ports 1 to 5 to be allocated to any desired LAN(s) independently of one another. In this case, the switching hubs 11, 12 and 13 permit a setting such that one port belongs to more than two VLANs. On the ATM network 10, different VLANs are identified as respective different emulated LANs (hereinafter referred to as "ELANs"). This makes it possible to construct VLANs across the switching hubs 11, 12 and 13. According to this VLAN function, multicast packets (including broadcast packets) are not transferred between different VLANS.

The VLAN server 14 is a node which forms the basis of this invention. The VLAN server 14 may be either located in an ATM switch (a switch in the ATM network which enables high-speed connection between a switching hub and a server) or connected to the IEEE 802.3 side insofar as it can be readily accessed from a global network management apparatus and can communicate with all related switching hubs. Preferably, in this embodiment, to permit communications equally with all switching hubs 11, 12 and 13, a separate VLAN having coverage of the entire network is set as a management VLAN and a VLAN identifier is allocated to this management VLAN.

Figure 2:
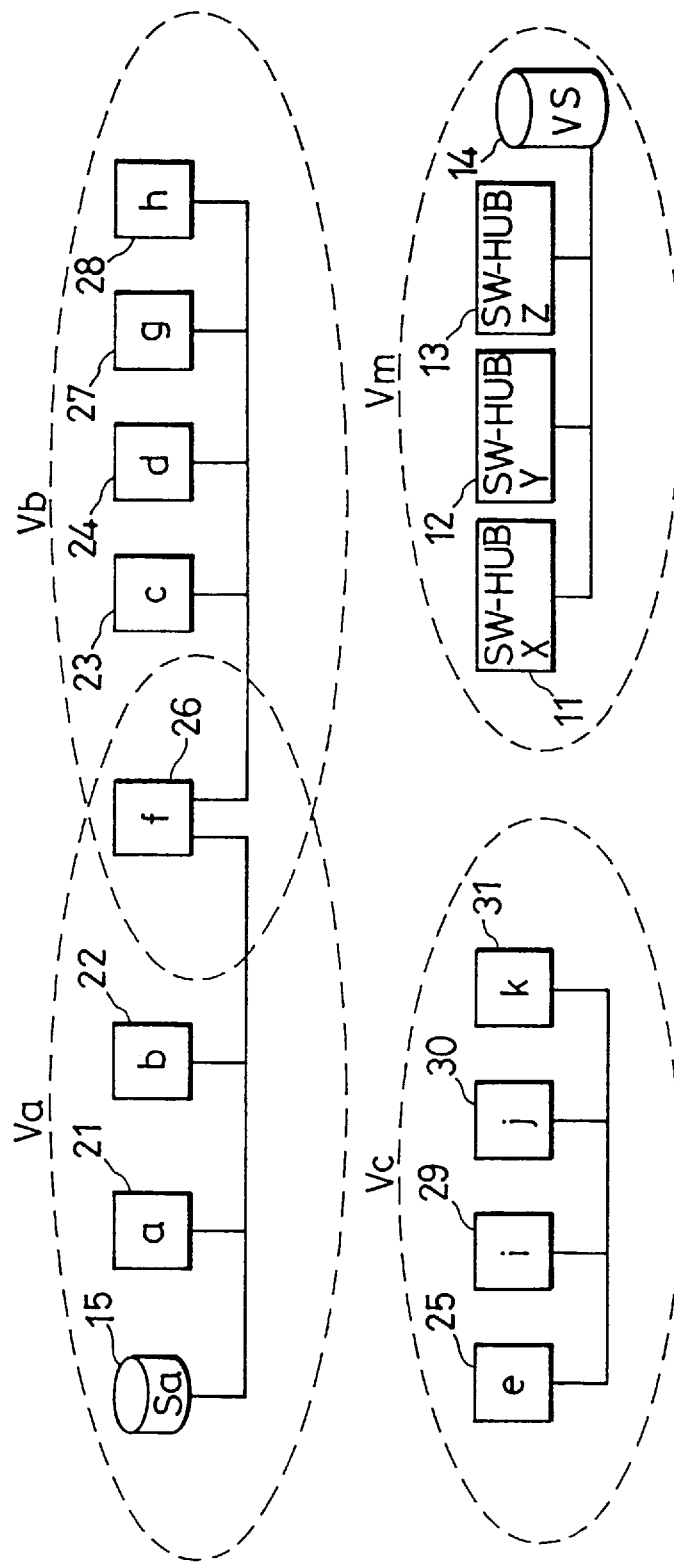
FIG. 2 is a diagram of a logical network of the VLAN system shown in FIG. 1.

In this embodiment, as shown in the logical network of FIG. 2, the switching hubs 11, 12 and 13, the VLAN server 14, and the file server 15 are assigned MAC addresses "SW-HUB X", "SW-HUB Y", "SW-HUB Z", "VS" and "Sa", respectively, and their ATM addresses are "X", "Y", "Z", "V" and "S", respectively. It is also assumed that nodes 21 to 25 connected to the ports 1 to 5 of the switching hub 11 are assigned MAC addresses "a", "b", "c", "d" and "e", respectively, that nodes 26 to 29 connected to the ports 1 to 4 of the switching hub 12 are assigned MAC addresses "f", "g", "h" and "i", respectively, and that nodes 30 and 31 connected to the ports 1 and 2 of the switching hub 13 are assigned MAC addresses "j" and "k", respectively.

As shown in FIG. 2, the file server 15 and the nodes 21, 22 and 26 belong to a VLAN with a VLAN identifier "Va", the nodes 23, 24 and 26 to 28 belong to a VLAN with a VLAN identifier "Vb", the nodes 25, 30 and 31 belong to a VLAN with a VLAN identifier "Vc", and the switching hubs 11 to 13 and the VLAN server 14 belong to a VLAN of the management with a VLAN identifier "Vm". Therefore, the ports 1 to 5 of the individual switching hubs 11 to 13 are configured in accordance with the VLANs to which the nodes connected thereto belong, as shown in, FIG. 1. In this embodiment, two or more VLANs may be allocated to a single node, like the node 26 which belongs to the two VLANs with the VLAN identifiers "Va" and "Vb". Also, in the illustrated embodiment, the individual VLANs are logically independent of one another, but they can communicate with other VLANs. In this case, however, it is necessary to connect external routers or to utilize a virtual router function of each switching hub.

The switching hubs 11 to 13 each have an address table shown in TABLE 1 below, and can change the addresses in the address table by means of their VLAN learning function. The address tables of the switching hubs 11 to 13 have a similar arrangement, and therefore, the address table of the switching hub 11 is shown below as a typical example.

TABLE 1

| MAC address | Port No./ VCC identifier | VLAN identifier |
|---|---|---|
| a | 1 | Va |
| b | 2 | Va |
| c | 3 | Vb |
| d | 4 | Vb |
| e | 5 | Vc |
| f | Vxya | Va + Vb |
| g | Vxyb | Vb |
| k | Vxzc | Vc |
| Sa | Vxsa | Va |

As shown in TABLE 1, in the address table of each switching hub are stored "MAC addresses" of the nodes, "port numbers" to which the respective nodes are connected or "VCC values" to be sent via LAN Emulation if the node is not connected to its port, and "VLAN identifiers" to which the respective nodes belong. This address table is used as an ordinary bridge transfer table. Bridge transfer of a packet is made to a port or VC (Virtual Channel) identified through a search of the MAC addresses.

In TABLE 1, "Vxya", "Vxyb", "Vxzc" and "Vxsa" are VCC identifiers which serve to establish connections between the switching hubs 11 and 12, between the switching hubs 11 and 12, between the switching hubs 11 and 13, and between the switching hub 11 and the file server 15, respectively, and which permit packets to be passed via the VLANs "Va", "Vb", "Vc" and "Va", respectively. In this embodiment, the address table of each switching hub is designed to permit entry of VLAN identifiers in order to deal with VLANs. Also, the address table is constructed in such a manner that information added as MAC address entries ages out or is lost when no reference is made for more than a predetermined time period, by means of the bridging learning function of the switching hub. The VLAN identifiers of the ports of each switching hub, however, are retained even if MAC address information associated with the ports ages out. This permits quick restoration of MAC addresses on the address table in the case where a MAC address once ages out due to temporary absence of communication and is recorded again thereafter, because it is unnecessary to search for the corresponding VLAN identifier.

The VLAN server 14 has a table shown in TABLE 2 below.

TABLE 2

| MAC address | SW-HUB identifier (ATM Address) | Port No. | VLAN identifier |
|---|---|---|---|
| a | X | 1 | Va |
| b | X | 2 | Va |
| c | X | 3 | Vb |
| d | X | 4 | Vb |
| e | X | 5 | Vc |
| f | Y | 1 | Va + Vb |
| g | Y | 2 | Vb |
| h | Y | 3 | Vb |
| i | Y | 4 | Vc |
| j | Z | 1 | Vc |
| k | Z | 2 | Vc |
| Sa | S | — | Vm |
| SW-HUB X | X | — | Vm |
| SW-HUB Y | Y | — | Vm |
| SW-HUB Z | Z | — | Vm |
| VS | V | — | Vm |

As shown in TABLE 2, in the table of the VLAN server 14 are stored "MAC addresses" of the nodes, "identifiers of the switching hubs" to which the nodes are connected (in this embodiment, ATM addresses are used as identifiers), "port numbers" to which the nodes are connected, and "identifiers of the VLANs" to which the nodes belong. Basically, this table retains the MAC addresses of all nodes associated with the VLANs and the VLAN identifiers related thereto, regardless of operating states of the nodes. In this embodiment, the contents of the table are stored in a nonvolatile memory and are not lost unless they are intentionally deleted by a network administrator. Also, in this embodiment, the contents of this table are basically not lost due to aging.

The following explains the case where the network is modified.

Figure 3:
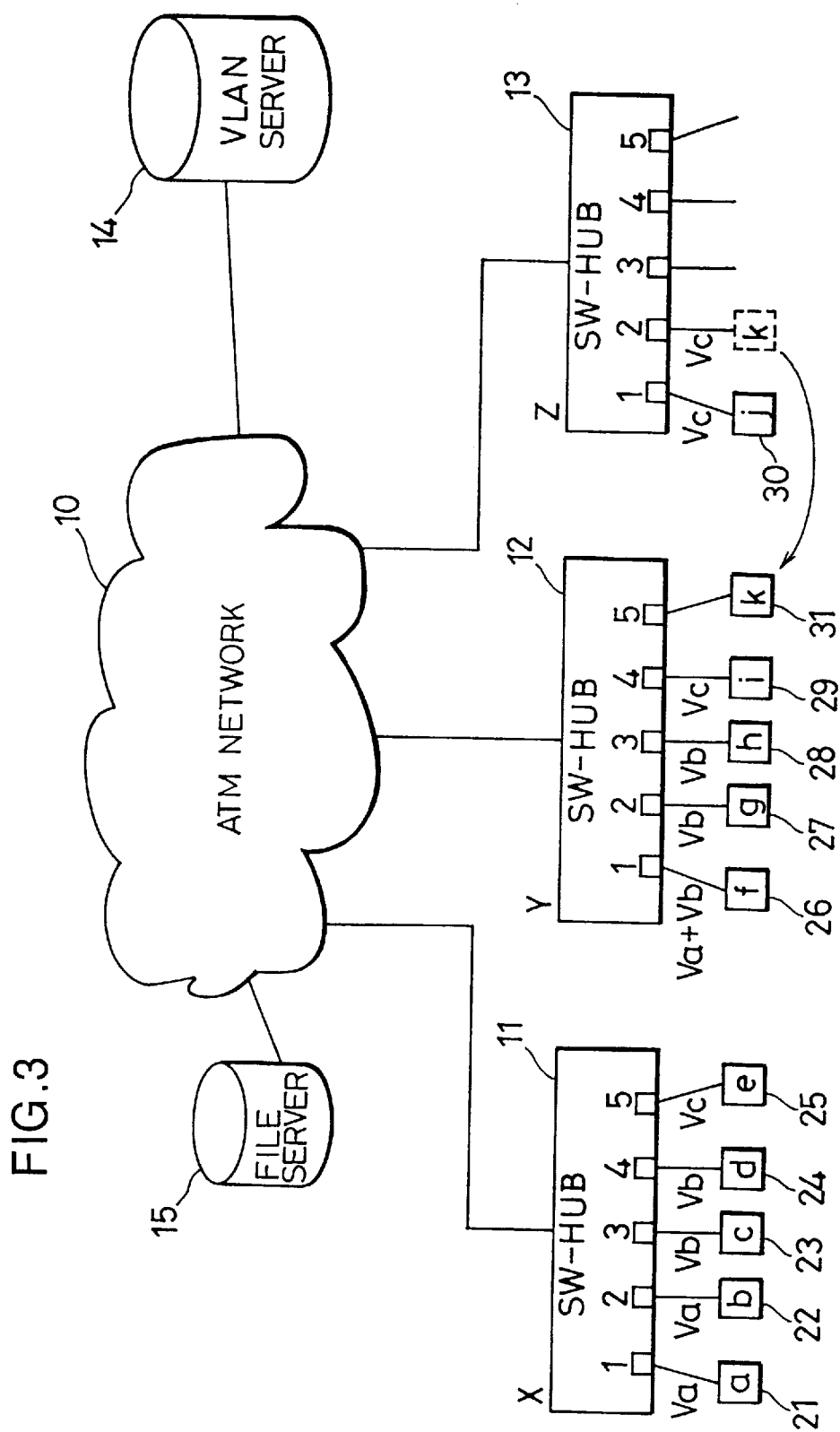
FIG. 3 is a diagram illustrating the case where a node connection is changed in the VLAN system shown in FIG. 1.
Figure 4:
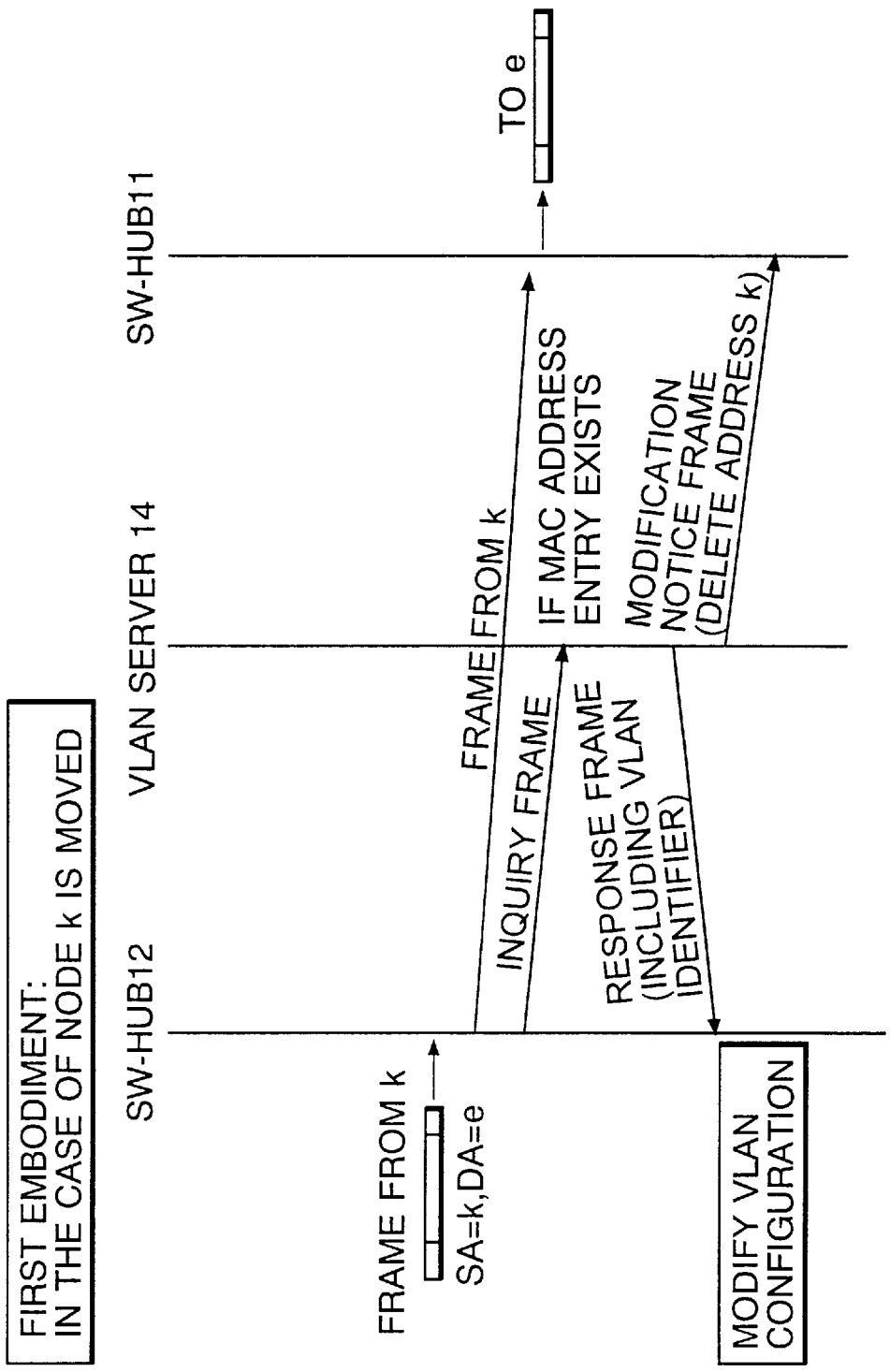
FIG. 4 is a process chart illustrating the process of operation of nodes shown in FIG. 3 according to a first embodiment.

FIG. 3 is a diagram illustrating a case where the network is modified in accordance with a first embodiment, or more specifically, in the VLAN system shown in FIG. 1, the node 31 connected to the switching hub 13 is moved and connected to the switching hub 12. FIG. 4 is a process chart showing the process of operation of nodes according to the first embodiment.

In the following description of the embodiment, it is assumed that frames using specific UDP port numbers of TCP/IP, for example, are transferred between switching hubs (including the VLAN server 14 and the file server 15) via the aforementioned VLAN "Vm".

As shown in FIG. 5, the frame has a format which is made up of a frame header including source and destination MAC addresses etc. on Ethernet, for example, an IP header indicative of the protocol TCP/IP, a UDP header having a specific UDP port number, a 1-byte command identifier indicating the type of command, a 6-byte MAC address, a 32-byte VLAN identifier, a 20-byte switching hub identifier (SW-HUB identifier), a 1-byte port number, etc.

As shown in TABLE 3 below, for example, frames can be roughly classified into four types, that is, "inquiry frame," "response frame," "learn/modify frame" and "modification notice frame" corresponding to the command identifiers "0" to "3", respectively.

Referring to TABLE 3, the "inquiry frame" identified by the command identifier "0" is a frame transmitted from a switching hub "H" to the VLAN server "S", as indicated by the direction "H→S". This frame includes a "MAC address" indicating the "MAC address of the node" which is making an inquiry about a VLAN identifier, a "VLAN identifier" indicating the "identifier of the VLAN" corresponding to the MAC address in question (in this case, "V?" because the identifier is unknown), a "switching hub (SW-HUB) identifier" indicating the "ATM address of the switching hub" which is making the inquiry, and a "port number" indicating the "port number" to which the node making the inquiry is connected.

The "response frame" identified by the command identifier "1" is a frame transmitted from the VLAN server "S" to a switching hub "H". In the response frame are stored the "MAC address" indicating the "MAC address of the node" which made the inquiry about the VLAN identifier, and the "VLAN identifier" indicating the "VLAN identifier (ELAN name)" to be responded. In this case, the "switching hub identifier" and the "port number" retain no data.

The "learn/modify frame" identified by the command identifier "2" is a frame transmitted from a switching hub "H" to the VLAN server "S". In the learn/modify frame, the "MAC address" indicates the "MAC address of the node" which is the subject of learning/modification, the "VLAN identifier" indicates the learned "VLAN identifier (ELAN name)", the "switching hub identifier" indicates the "ATM address of the switching hub," and the "port number" indicates the "corresponding port number."

The "modification notice frame" identified by the command identifier "3" is a frame transmitted from the VLAN server "S" to a switching hub "H". In the modification notice frame, the "MAC address" indicates the "MAC address of the node" which is the subject of modification, the "VLAN identifier" indicates the "VLAN identifier (ELAN name)" to be changed to, the "switching hub identifier" indicates the "ATM address of the switching hub," and the "port number" indicates the "corresponding port number." In the case of the "modification notice frame," the "switching hub identifier" and the "port number" may retain no data when the "VLAN identifier" alone is modified.

Figure 6:
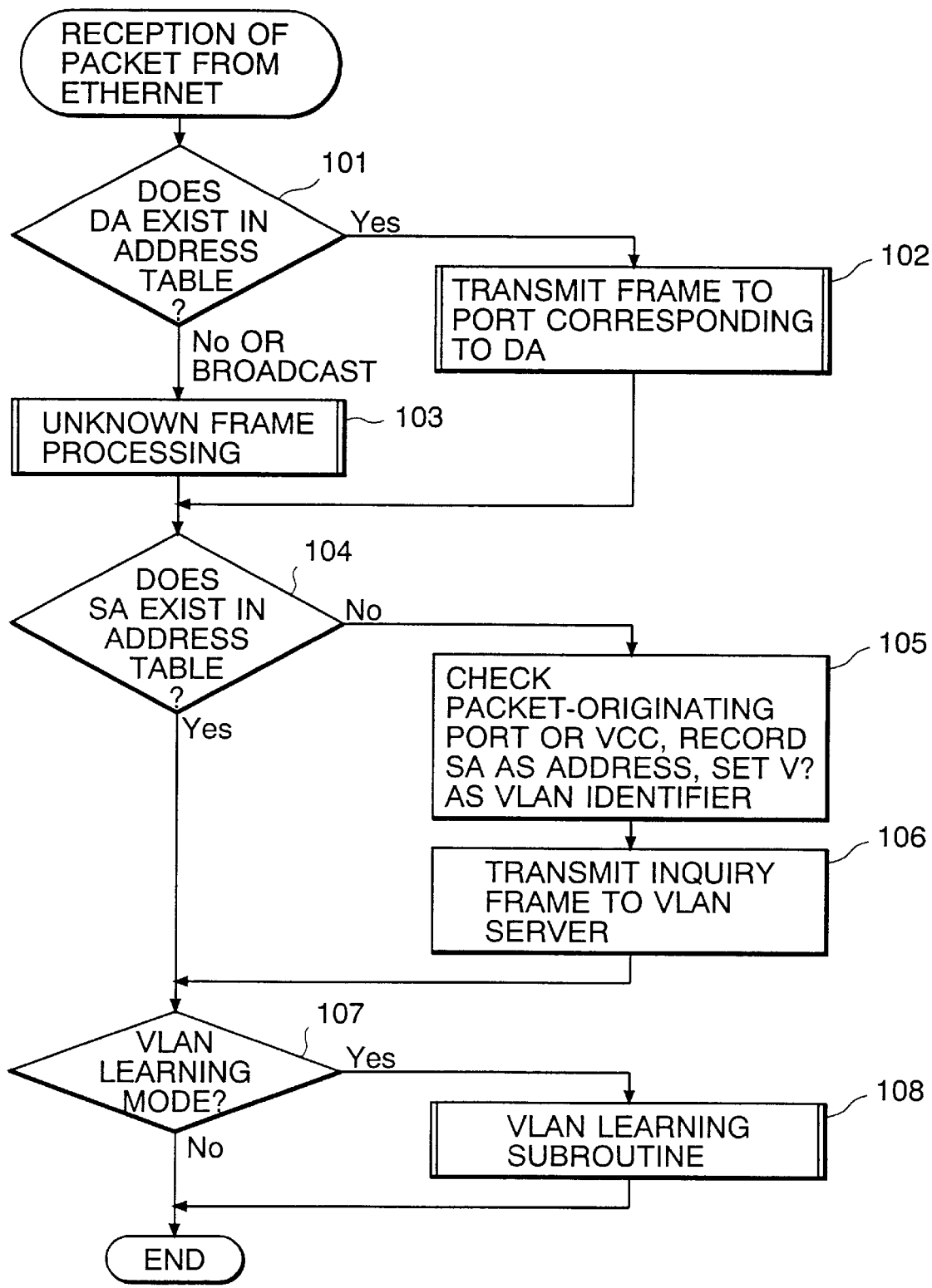
FIG. 6 is a flowchart illustrating how a switching hub shown in FIG. 1 operates when a packet is received.

In the first embodiment, the switching hub 12 performs the process shown in the flowchart of FIG. 6 upon receiving a packet from the node 31 connected to the port 5. The following description of the embodiment is based on the assumption that a packet is transferred via Ethernet, by way of example. Also, the address table of the switching hub 12 has the content shown in TABLE 4 below.

TABLE 3

| Frame name | Direction | Command identifier | MAC address | VLAN identifier | SW-HUB identifier | Port No. |
|---|---|---|---|---|---|---|
| Inquiry frame | H → S | 0 | MAC address to be inquired | V? | ATM address of SW-HUB | corresponding port No. |
| Response frame | S → H | 1 | Inquired MAC address | Responded VLAN identifier (ELAN NAME) | | |
| Learn/ modify frame | H → S | 2 | MAC address to learn/modify | Learned VLAN identifier (ELAN NAME) | ATM address of SW-HUB | corresponding port No. |
| Modification notice frame | S → H | 3 | MAC address to be changed | VLAN identifier to be changed (ELAN NAME) | (ATM address of SW-HUB) | (corresponding port No.) |

TABLE 4

| MAC address | Port No./ VCC identifier | VLAN identifier |
|---|---|---|
| d | Vyxb | Vb |
| e | Vyxc | Vc |
| f | 1 | Va + Vb |
| g | 2 | Vb |

TABLE 4-continued

| MAC address | Port No./VCC identifier | VLAN identifier |
| --- | --- | --- |
| h | 3 | Vc |
| Sa | Vysa | Va |
| ⋮ | ⋮ | ⋮ |

In TABLE 4, "Vyxb" and "Vysa" are VCC identifiers which serve to establish connections between the switching hubs 12 and 11 and between the switching hub 12 and the file server 15, respectively, and which permit packets to be passed via the VLANs "Vb" and "Va", respectively.

Referring now to FIG. 6, the switching hub 12 first determines whether or not the destination address DA in the frame exists in its address table (Step 101). The destination address DA in this case is the MAC address "e" of the node 25, as shown in FIG. 4, and therefore, the switching hub 12 judges that the destination address DA is registered in its address table. The switching hub 12 then transmits the frame to the port 5 of the switching hub 11 as specified by the destination address DA (MAC address "e") (Step 102).

If it is judged in Step 101 that the destination address DA of the frame is not registered in the address table of the switching hub 12 or if the frame is a broadcast frame, the switching hub 12 executes an unknown frame processing in which the frame is transmitted to all nodes (Step 103).

Subsequently, the switching hub 12 determines whether or not the source address SA in the frame exists in its address table (Step 104). If the source address SA is registered as a MAC address entry in the address table, the address table learns the source address, as in normal bridge transfer, and the MAC address and the port number are added as new entries.

If, however, the VLAN identifier number associated with the node 31 is not found, the switching hub 12 temporarily sets "V?" as the VLAN identifier in the address table, as shown in TABLE 5 below, for example (Step 105).

TABLE 5

| MAC address | Port No./VCC identifier | VLAN identifier |
| --- | --- | --- |
| d | Vyxb | Vb |
| e | Vyxc | Vc |
| f | 1 | Va + Vb |
| g | 2 | Vb |
| h | 3 | Vc |
| Sa | Vysa | Va |
| ⋮ | ⋮ | ⋮ |
| k | 5 | V? |

The switching hub 12 then sends an inquiry frame (see TABLE 3) to the VLAN server 14 via the ATM network 10 to inquire about the VLAN identifier associated with the MAC address in question (Step 106), and ends the receiving operation for this packet. The inquiry frame transmitted in this case stores "0" as the command identifier following the UDP header, the MAC address of the node 31 as the MAC address, "V?" as the VLAN identifier, the ATM address of the switching hub 12 as the switching hub identifier, and "5" as the port number.

Subsequently, the switching hub 12 determines whether or not it is in VLAN learning mode (Step 107); since in this case, the switching hub 12 is not in VLAN learning mode, the receiving operation for this packet is ended. In the case where the switching hub 12 is in VLAN learning mode, the hub 12 executes a subroutine for VLAN identifier learning mode (Step 108).

Figure 7:
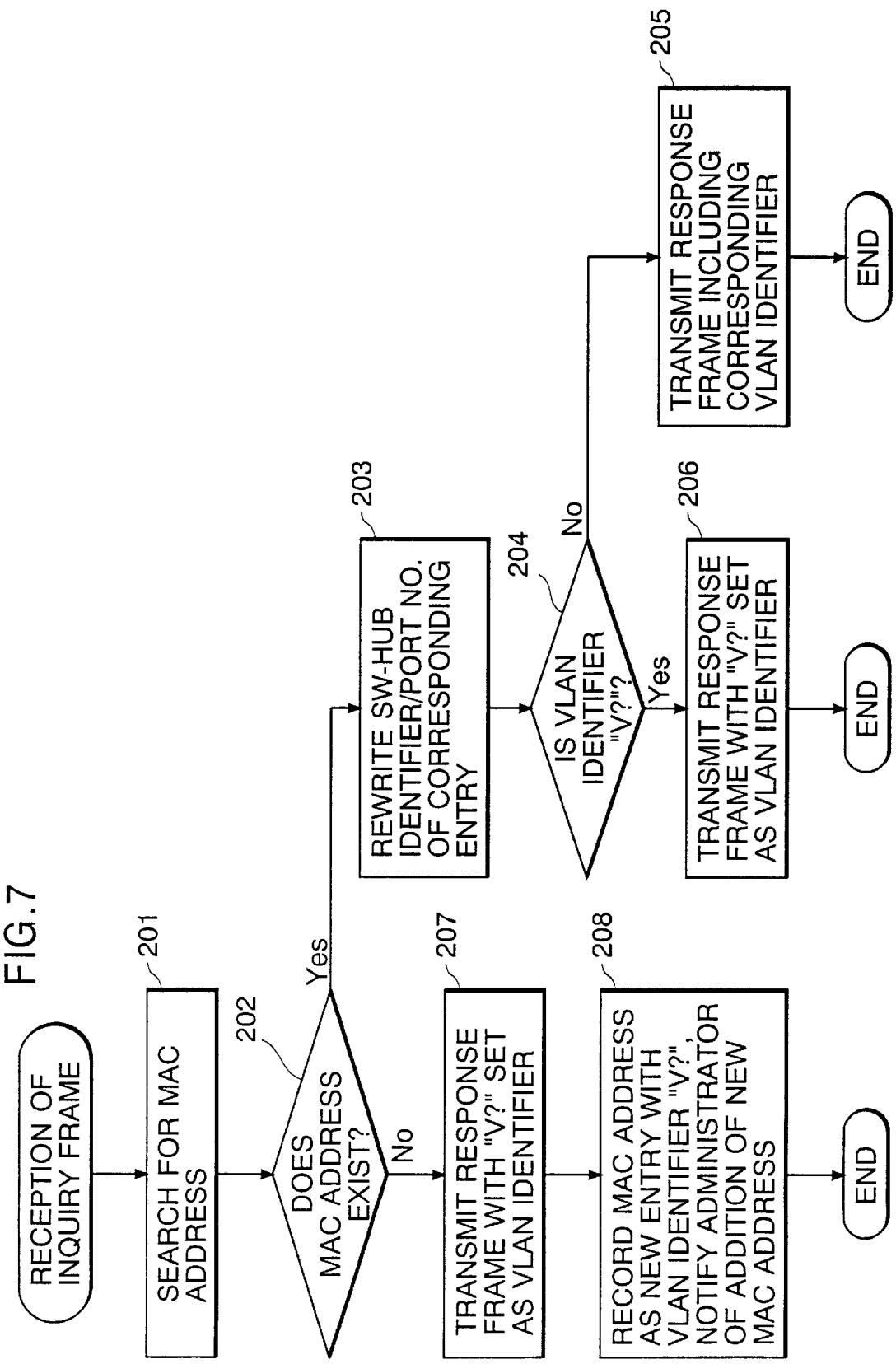
FIG. 7 is a flowchart illustrating how a VLAN server operates when an inquiry frame is received.

On receiving the inquiry frame, the VLAN server 14 executes the process shown in the flowchart of FIG. 7. Referring to FIG. 7, first, based on the MAC address in the inquiry frame (see FIG. 5), the VLAN server 14 searches its table for this MAC address (Step 201), to determine whether or not the MAC address is recorded in the table (Step 202). In this case, the table has an entry of the MAC address "k" corresponding to the node 31, as shown in TABLE 2. If the switching hub identifier and port number described in the inquiry frame differ from the contents of the table, then it means that the port to which the node 31 is connected has been changed. Accordingly, the VLAN server 14 rewrites the switching hub identifier and port number stored in its table in association with the MAC address in question (Step 203).

Then, the VLAN server 14 searches for a VLAN identifier associated with this MAC address, to determine whether the VLAN identifier is "V?" or not (Step 204). The VLAN identifier stored in association with the MAC address of the node 31 is, in this case, "Vc" and not "V?"; therefore, a response frame including this VLAN identifier "Vc" is created. The response frame (see TABLE 3) is then transmitted to the switching hub 12 (Step 205). Namely, the VLAN server 14 rewrites the switching hub identifier and the port number, which are stored in its table in association with the MAC address of the node 31, to "Y" and "5", respectively, and sends the response frame to the switching hub 12 from which the inquiry frame was received. The response frame includes the MAC address "k" of the node 31, and the VLAN identifier "Vc".

Further, the VLAN server 14 sends a modification notice frame (see TABLE 3) to the switching hub 13 from which the node 31 was removed. The modification notice frame transmitted in this case includes "3" as the command identifier following the UDP header, "k" as the MAC address of the node 31 which is the subject of modification, "Vc" as the VLAN identifier, the ATM address of the switching hub 12 to which the node 31 was connected, and "5" as the port number.

Figure 8:
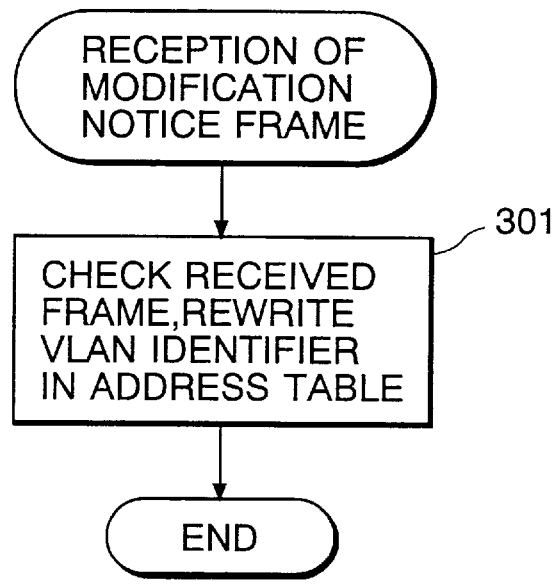
FIG. 8 is a flowchart illustrating how a switching hub operates when a modification notice frame is received.

Referring now to the flowchart of FIG. 8, when the modification notice frame is received, the switching hub 13 rewrites the entry of the corresponding MAC address (the MAC address "k" of the node 31) in its own address table (Step 301). In this embodiment, the address associated with the node 31 is deleted.

If it is judged in Step 204 in FIG. 7 that the VLAN identifier stored in association with the MAC address of the node 31 is "V?", the VLAN server 14 creates a response frame including the VLAN identifier "V?" and sends it to the switching hub 12 (Step 206).

Figure 9:
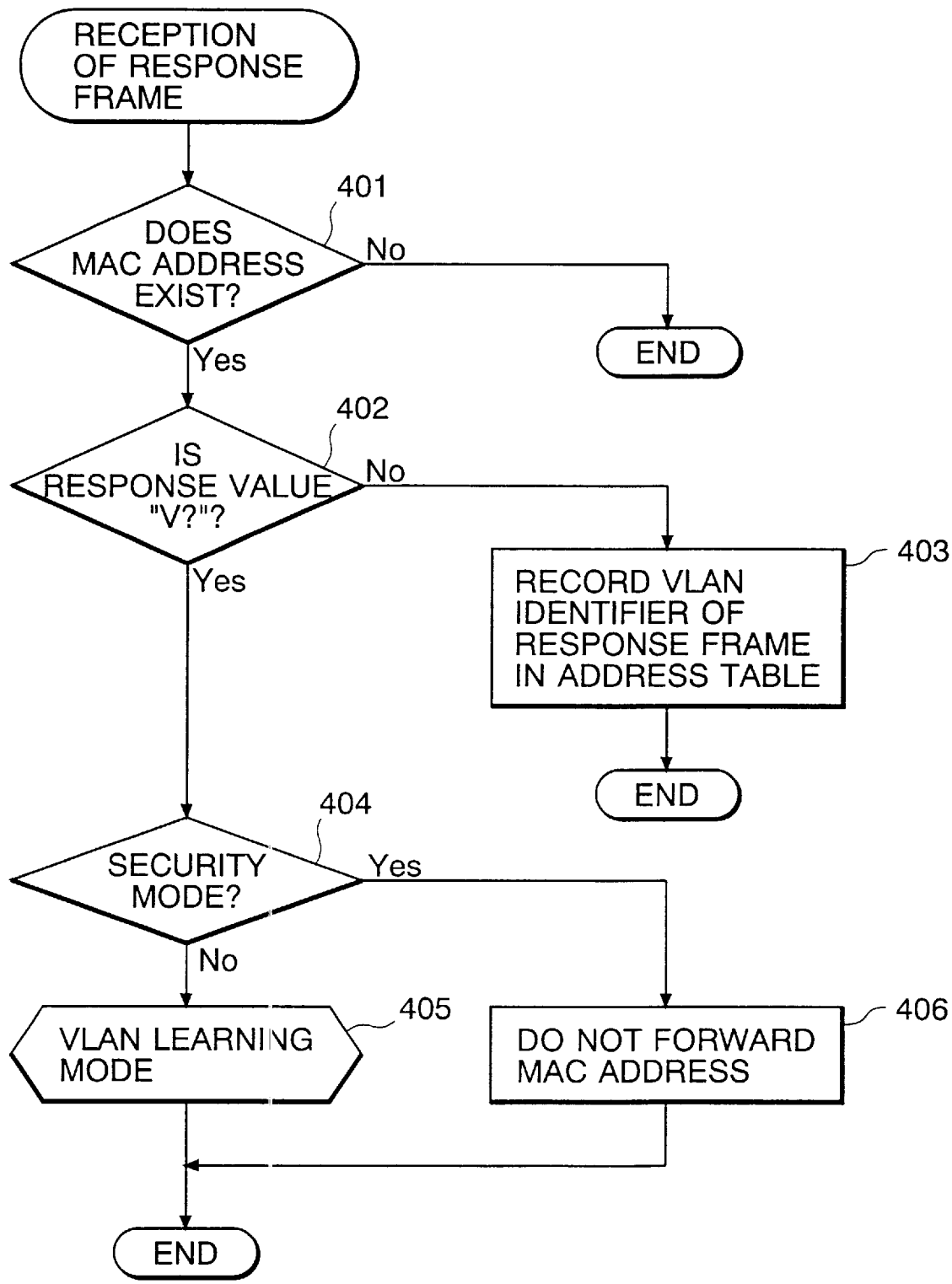
FIG. 9 is a flowchart illustrating how a switching hub operates when a response frame is received.

Referring now to the flowchart of FIG. 9, when the response frame is received, the switching hub 12 determines based on the MAC address in the frame whether or not this MAC address exists in its address table (Step 401). Since the MAC address "k" of the node 31 is already recorded, the switching hub 12 then determines whether the VLAN identifier in the response frame is "V?" or not (Step 402). The VLAN identifier is "Vc" and not "V?"; therefore, the address table is searched for a VLAN identifier corresponding to the MAC address "k" of the node 31, and "V?" stored as the VLAN identifier is replaced by "Vc" (Step 403).

In this manner, according to this embodiment, the port 5 of the switching hub 12 becomes available as a port connected to the VLAN "Vc".

In the address table of the switching hub 12, "V?" remains set as a VLAN identifier until a response frame is received from the VLAN server 14. During this period of time, it may be assumed that connections with all VLANs are provisionally unavailable. Alternatively, assuming that connections with all VLANs are available, a broadcast or multicast frame whose source is the port in question or its corresponding MAC address may be transferred/sent to all VLANs.

Therefore, in this embodiment, the switching hub 12 can inquire about an unknown VLAN identifier of a node by means of its MAC address, and can acquire a correct VLAN identifier from the VLAN server 14. Thus, even in the case where a node is moved and connected to a different switching hub, the switching hub 12 can automatically and readily acquire the correct VLAN identifier as soon as a frame is generated by the node.

Further, according to this embodiment, a modification notice frame is transmitted from the VLAN server 14 to the switching hub from which the node was moved, whereby this switching hub also can readily recognize the movement (change) of the node.

Namely, in this embodiment, the VLAN server stores not only the MAC addresses and VLAN identifiers of the nodes, but also the identifiers and port numbers of the switching hubs to which the nodes are connected, in association with the respective nodes. A switching hub makes an inquiry about a VLAN identifier by sending to the VLAN server a frame including the MAC address of a node in question, modifies the contents of its table in accordance with a VLAN identifier responded from the VLAN server, and performs required VLAN setting for the port. Consequently, complicated virtual networks can be collectively managed with ease via the VLAN server, and it is also possible to facilitate the data transfer of each switching hub on the basis of the contents of the table, as well as the modification of the contents of the table in accordance with a VLAN identifier responded from the VLAN server. This embodiment, therefore, permits automatic reconstruction and modification of virtual networks.

Figure 10:
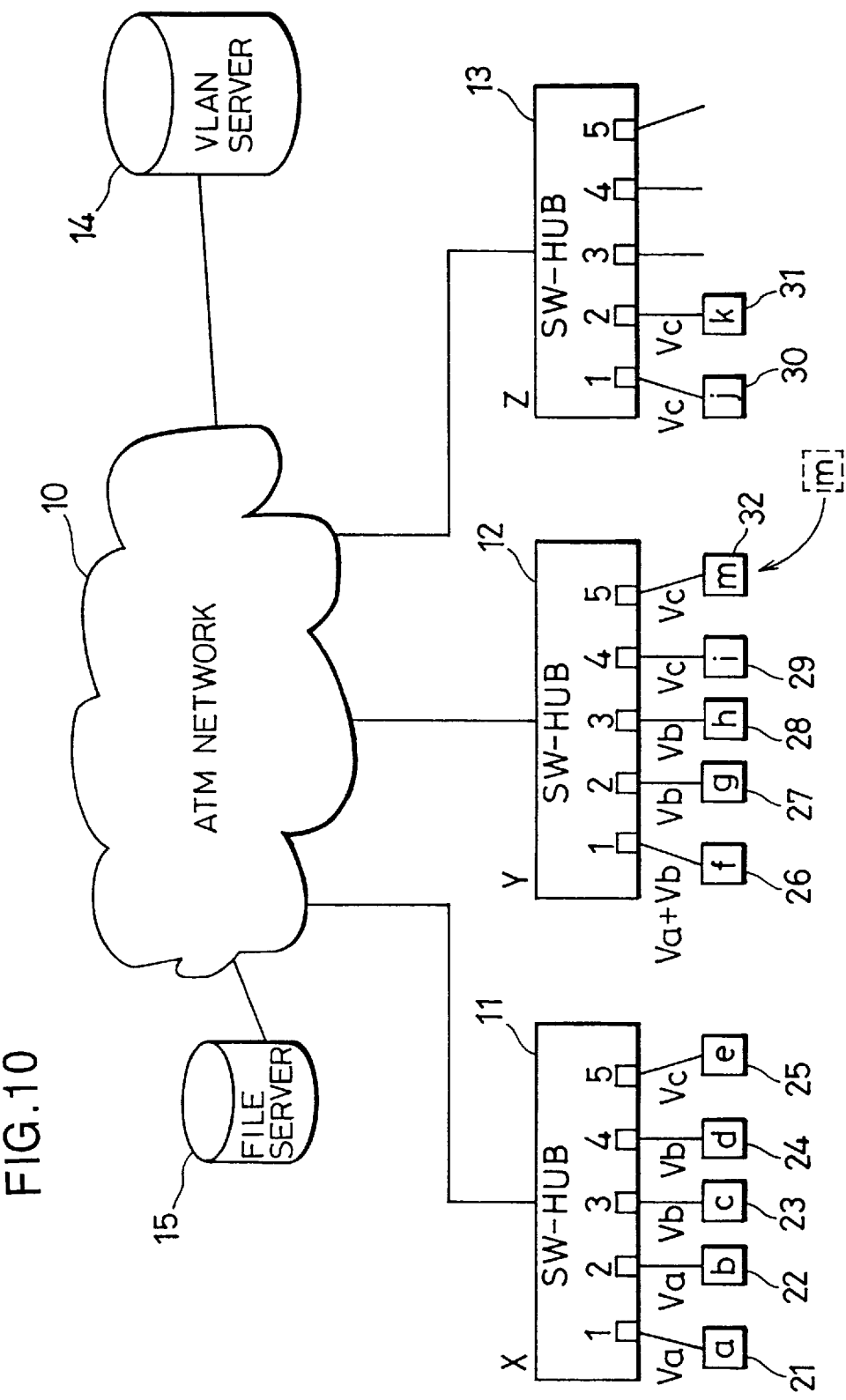
FIG. 10 is a diagram illustrating the case where a new node is connected to one of the switching hubs shown in FIG. 1.

Referring now to FIG. 10, another modification of the network, or more specifically, an addition of a new node 32 to the switching hub 12, will be explained. Such a modification can take place in one of two ways, that is, the case where the MAC address "m" of the node 32 is not yet recorded in the VLAN server 14 (second embodiment), and the case where the MAC address "m" is already recorded in the VLAN server 14 (third embodiment). The process of operations of nodes according to the second embodiment will be explained first with reference to the process chart of FIG. 11.

In the second embodiment, on receiving a packet destined for the node 25 from the node 32 connected to the port 5, the switching hub 12 performs the operation shown in the flowchart of FIG. 6.

Figure 11:
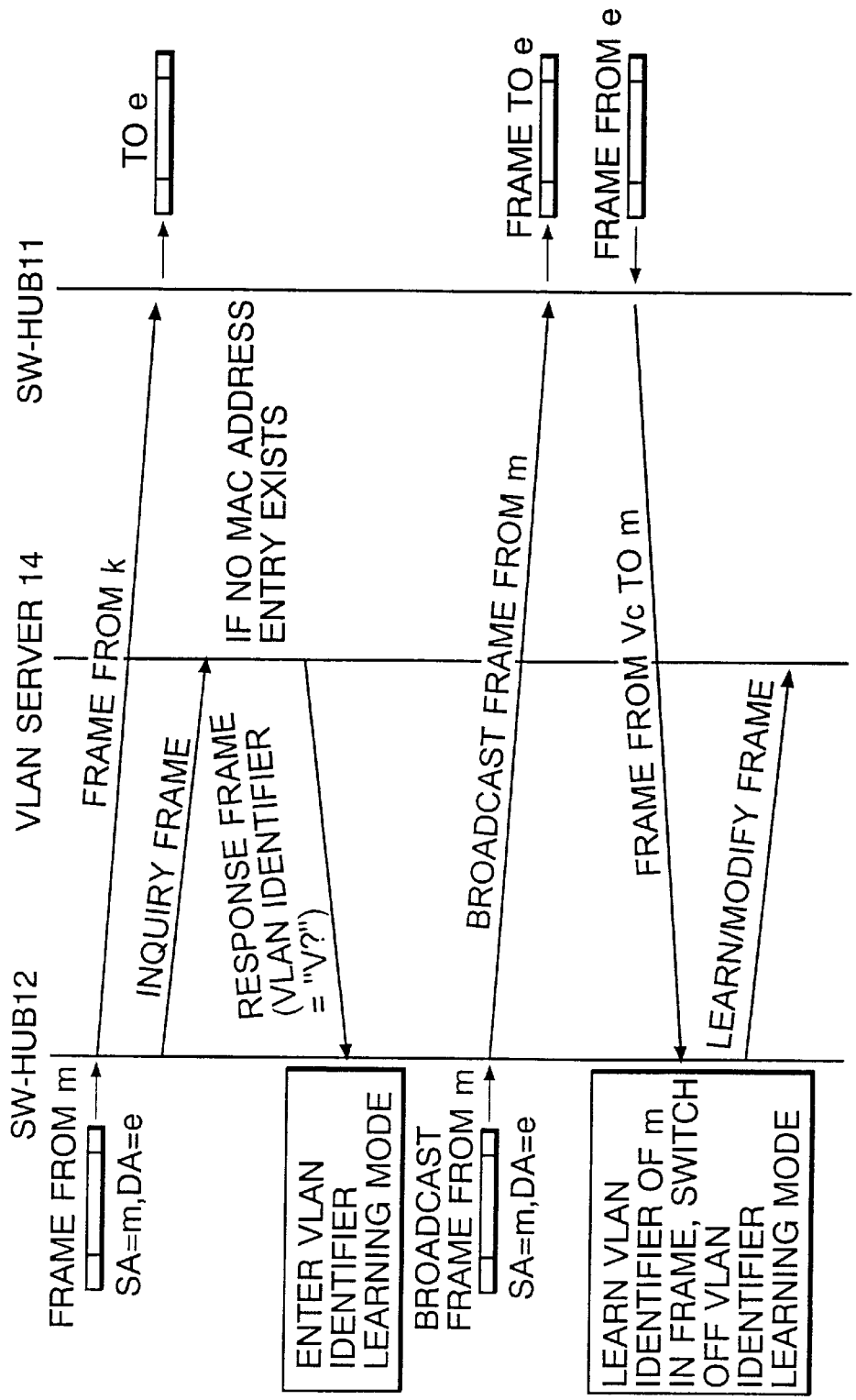
FIG. 11 is a process chart illustrating the process of operation of nodes shown in FIG. 10 according to a second embodiment.

Referring to FIG. 6, the switching hub 12 first determines whether or not the destination address DA in the frame exists in its address table (Step 101). In this case, the destination address DA is the MAC address "e" associated with the node 25, as shown in FIG. 11. Therefore, the switching hub 12 sends the frame via the ATM network 10 to the node 25 connected to the switching hub 11 (Step 102), and then judges in Step 104 that the MAC address "m" of the node 32 is not recorded in its address table.

Subsequently, in Step 105, the switching hub 12 checks the port from which the packet was received or the VCC, and records "m" as a MAC address entry in the address table corresponding to the port 5, as shown in TABLE 6 below. The switching hub 12 then temporarily sets "V?" as a VLAN identifier associated with this MAC address, and sends an inquiry frame to the VLAN server 14 to inquire about the VLAN identifier associated with the MAC address "m" (Step 106).

TABLE 6

| MAC address | Port No./ VCC identifier | VLAN identifier |
| --- | --- | --- |
| d | Vyxb | Vb |
| e | Vyxc | Vc |
| f | 1 | Va + Vb |
| g | 2 | Vb |
| h | 3 | Vc |
| Sa | Vysa | Va |
| : | : | : |
| m | 5 | V? |

Referring now to FIG. 7, on receiving the inquiry frame, the VLAN server 14 searches its table for a MAC address entry of the node 32 included in the inquiry frame (Step 201). However, it is concluded that no corresponding MAC address exists (Step 202), and therefore, the VLAN server 14 judges that a new node has been added. The VLAN server 14 then creates a response frame including the MAC address "m" of the node 32 and the VLAN identifier "V?", which indicates that the node in question is not recorded, and sends this response frame to the switching hub 12 from which the inquiry frame was received (Step 207).

Further, the VLAN server 14 adds the MAC address entry "m" of the node 32 to its table, temporarily records "V?" as the corresponding VLAN identifier, and notifies the administrator of the addition of the new MAC address "m" (Step 208).

Referring to FIG. 9, on receiving the response frame, the switching hub 12 judges that the MAC address "m" in the frame exists in its address table and also that the VLAN identifier in the response frame is "V?" (Steps 401, 402), and then determines whether the operation mode of the system is security mode or not (Step 404). In this case, the system is previously not set in security mode; therefore, the switching hub 12 switches to the VLAN identifier learning mode so as to learn the VLAN identifier (Step 405). If the system is in security mode, the MAC address in question is not forwarded (Step 406), and the routine is ended.

When a broadcast frame whose source is the node 32 with the MAC address "m" is generated, the switching hub 12 sends the broadcast frame, of which the destination address DA is set to "1", to all nodes.

Figure 12:
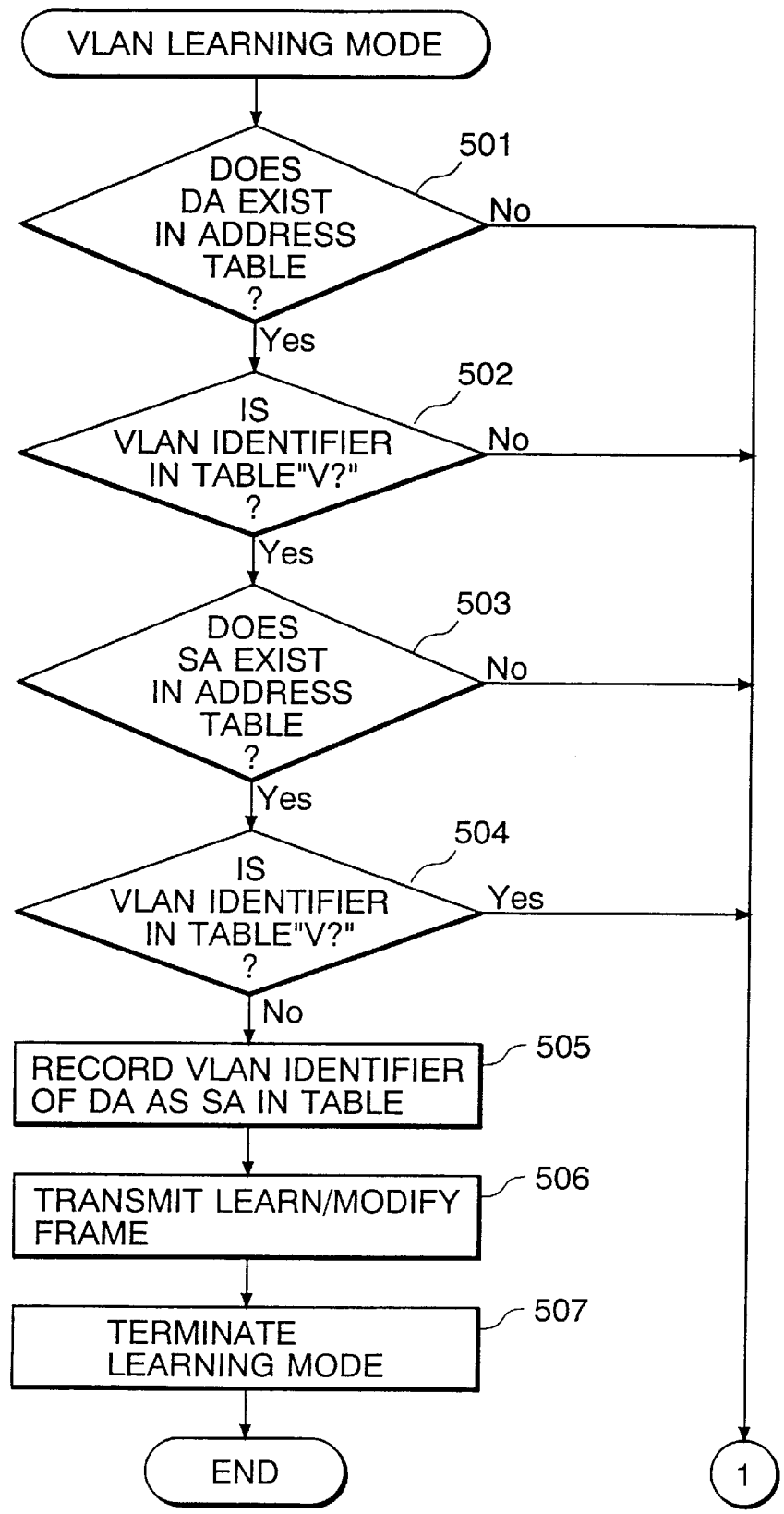
FIG. 12 is a flowchart illustrating a VLAN identifier learning mode according to this invention.
Figure 13:
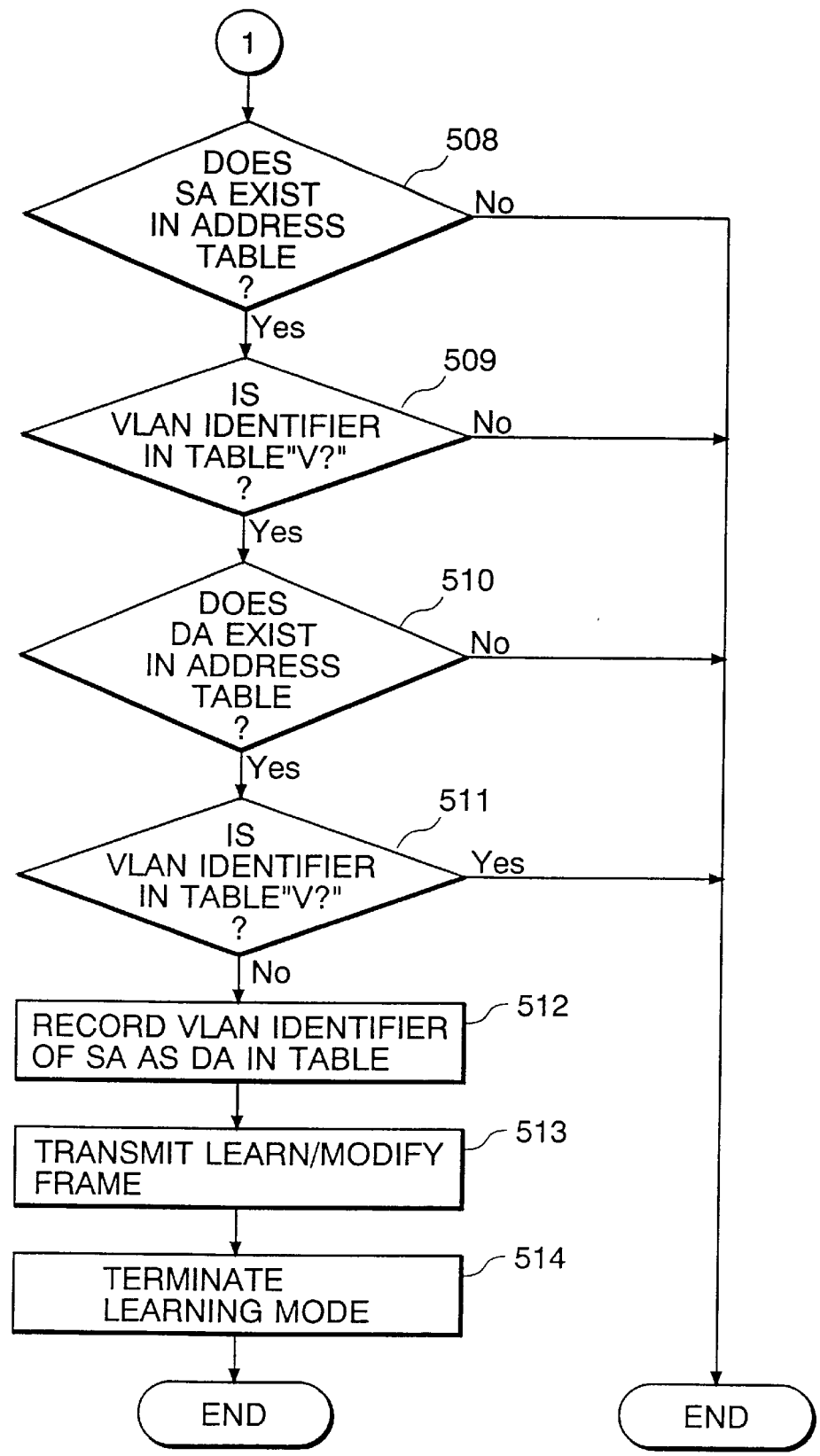
FIG. 13 is a flowchart also illustrating the VLAN identifier learning mode.
Figure 15:
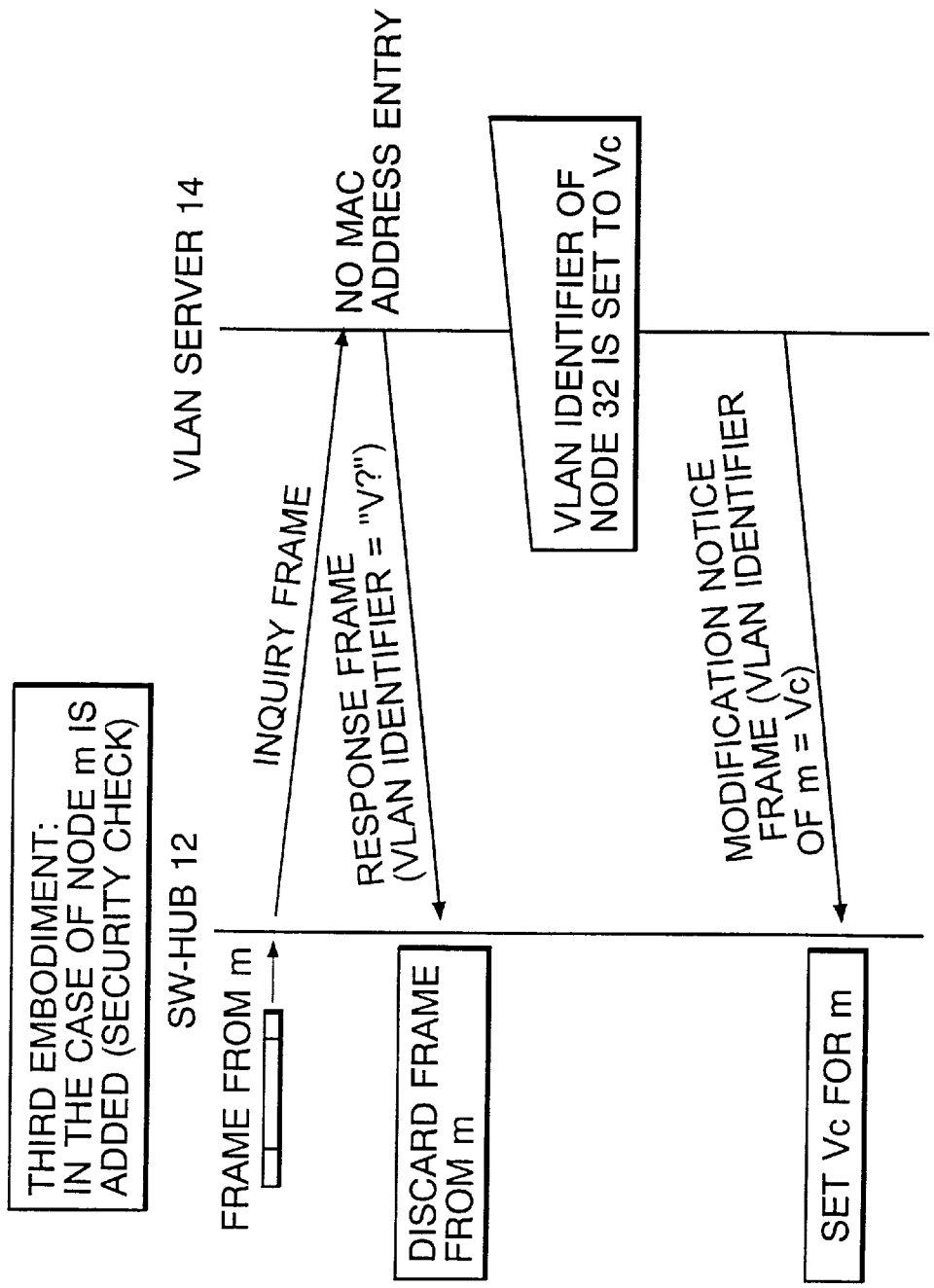
FIG. 15 is a process chart illustrating the process of operation of nodes shown in FIG. 10 according to a third embodiment.

On the other hand, when a frame is transmitted from a node with the VLAN identifier "Vc", for example, the node 25, to the node 32, the VLAN identifier of the node 32 is learned in accordance with the flowchart of FIGS. 12 and 13 showing the VLAN identifier learning mode. Here it is assumed that the address table of the switching hub 12 is in the state shown in TABLE 6.

Referring to FIGS. 12 and 13, on receiving the frame destined for the node 32 with the MAC address "m" from the node 25 (see FIG. 11), the switching hub 12 determines whether or not the destination address DA in the frame exists in its address table (Step 501). Also, the switching hub 12 determines whether the corresponding VLAN identifier in the address table is "V?" or not (Step 502).

The MAC address "m" is recorded in the address table and its corresponding VLAN identifier in the table is "V?"; therefore, the switching hub 12 determines whether or not the source address SA in the frame exists in the address table (Step 503). The switching hub 12 also determines whether the corresponding VLAN identifier in its address table is "V?" or not (Step 504).

The MAC address "e" is recorded in the address table, and its corresponding VLAN identifier in the table is "Vc" and not "V?". Accordingly, the switching hub 12 records, as the VLAN identifier entry associated with the MAC address "m" (corresponding to the destination address DA), the VLAN identifier "Vc" associated with the source address "e" in the address table (Step 505). Then, the switching hub 12 transmits a learn/modify frame (see TABLE 3), which includes the learned data (the data indicating that the VLAN identifier of the node 32 with the MAC address "m" is "Vc"), to the VLAN server 14 (Step 506), and terminates the learning mode (Step 507).

In the case where a unicast frame is generated of which the source address SA is the MAC address "m" of the node 32 and which specifies a destination node (e.g., the node 25 with the MAC address "e") by the destination address DA, the switching hub 12 searches its address table for the destination address, as in ordinary bridge transfer. If the address table has an entry of the destination address, the switching hub 12 transmits the unicast frame to the port 5 of the switching hub 11 or to the VC (Virtual Channel).

Also in this case, the switching hub 12 learns the VLAN identifier of the node 32, following the VLAN identifier learning procedure shown in the flowchart of FIGS. 12 and 13.

Referring to FIGS. 12 and 13, on receiving a frame destined for the node 25 with the MAC address "e" from the node 32, the switching hub 12 determines whether or not the destination address DA in the frame exists in its address table (Step 501). Then, the switching hub 12 determines whether the corresponding VLAN identifier in its address table is "V?" or not (Step 502).

The MAC address "e" is recorded in the address table and its corresponding VLAN identifier in the table is "Vc" and not "V?"; therefore, the switching hub 12 determines whether or not the source address SA in the frame exists in its address table (Step 508). Further, the switching hub 12 determines whether the corresponding VLAN identifier in its address table is "V?" or not (Step 509).

Since the MAC address "m" is recorded in the address table and its corresponding VLAN identifier in the table is "V?", the switching hub 12 determines whether or not the destination address DA in the frame exists in its address table (Step 510), and then determines whether the corresponding VLAN identifier in the address table is "V?" or not (Step 511).

The MAC address "e" is recorded in the address table and its corresponding VLAN identifier in the table is "Vc" and not "V?". Accordingly, the switching hub 12 records, as the VLAN identifier entry associated with the MAC address "m" (corresponding to the source address SA), the VLAN identifier "Vc" associated with the source address "e" in the address table (Step 512). Then, the switching hub 12 transmits a learn/modify frame, which includes the learned data (the data indicating that the VLAN identifier of the node 32 with the MAC address "m" is "Vc"), to the VLAN server 14 (Step 513), and terminates the learning mode (Step 514).

Figure 14:
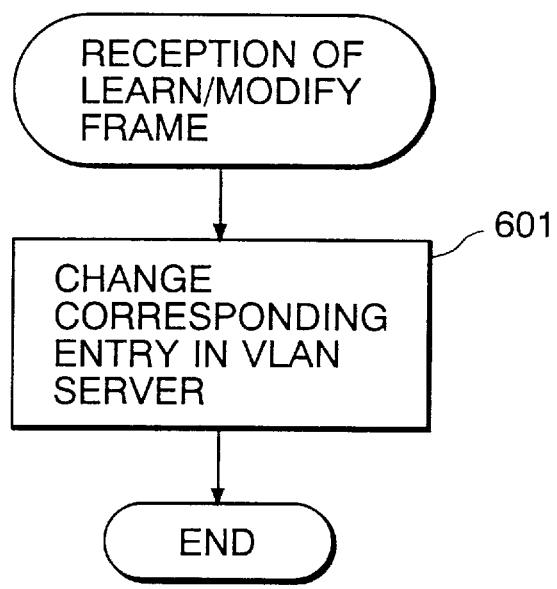
FIG. 14 is a flowchart illustrating how a VLAN server shown in FIG. 10 operates when a learn/modify frame is received.

Referring now to FIG. 14, on receiving the learn/modify frame, the VLAN server 14 searches its table for the corresponding entry in accordance with the contents of the frame. The VLAN server 14 then changes the VLAN identifier associated with the MAC address "m" to "Vc" (Step 601).

Thus, in this embodiment, the VLAN identifier of a newly added node is determined based on the VLAN identifier of the destination or source address in a transmitting or received frame, whereby the VLAN identifier of the newly added node can be automatically detected and the addition of new nodes is facilitated.

Since a port can belong to a plurality of VLANs, the embodiment may be modified in such a manner that the learning mode of the switching hub is continued and is not terminated when a VLAN identifier is learned once.

There may also be a case where the newly added node 32 should be rendered incapable of communicating until the administrator completes a certain process for the node. In such a case, the nodes shown in FIG. 10 are operated in accordance with a third embodiment, as shown in the process chart of FIG. 15, so that the switching hub 12 may not enter the VLAN identifier learning mode.

Specifically, in the third embodiment, the system is in advance set in security mode. When a response frame in answer to an inquiry is received from the VLAN server 14, the switching hub 12 judges that the MAC address "m" in the frame is recorded in its address table and also that the VLAN identifier in the response frame is "V?" (Steps 401, 402 in FIG. 9). The switching hub 12 then determines whether the operation mode of the system is security mode or not (Step 404).

The security mode is in this case on; therefore, in accordance with this setting, the switching hub 12 discards the received frame including the MAC address "m", instead of forwarding the same (Step 406).

When the VLAN identifier entry for the node 32 with the MAC address "m" is changed from "V?" to "Vc" by the administrator, the VLAN server 14 transmits a modification notice frame, which indicates that the VLAN identifier for the node 32 with the MAC address "m" has been changed to "Vc", to the switching hub 12.

Referring to FIG. 8, on receiving the modification notice frame, the switching hub 12 checks the contents of the frame and searches its address table for the corresponding entry. Then, the switching hub 12 sets "Vc" as the VLAN identifier associated with the MAC address "m" (Step 301).

Thus, in the third embodiment, VLAN identifier setting is made in response to a modification notice from the VLAN server after the administrator completes the required process for a new node, whereby the VLAN management by the administrator is facilitated and the security of the system is enhanced.

Also, in this embodiment, a newly added node may be displayed at the VLAN server so that the addition of the node can be recognized at a glance, to permit the administrator to identify the new MAC address entry and set the VLAN identifier with ease. In this case, even if a node is connected with a view to intentional obstruction of the network or illegal entry to the network, it is possible to avoid such situations because the administrator can readily detect the connection of the node.

Figure 16:
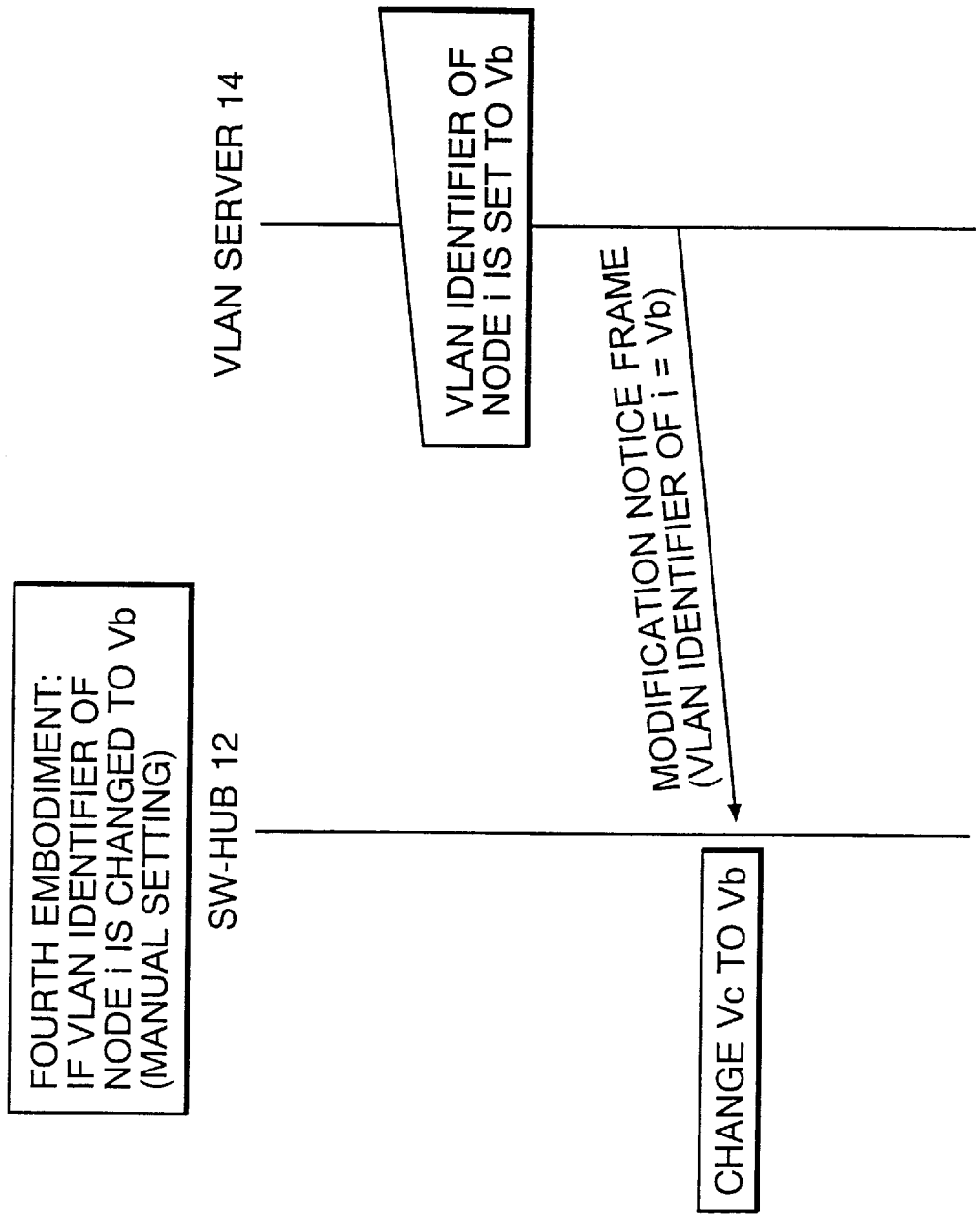
FIG. 16 is a process chart illustrating the process of operation of nodes shown in FIG. 1 according to a fourth embodiment.

Now, how the VLAN setting of the node 29 shown in FIG. 1 is changed from "Vc" to "Vb" according to a fourth embodiment will be described with reference to the process chart of FIG. 16. As shown in FIG. 16, the administrator first accesses the table of the VLAN server 14 and then changes the VLAN identifier associated with the MAC address "i" from "Vc" to "Vb".

In accordance with this change in setting, the VLAN server 14 transmits a modification notice frame including the modified data (the data indicating that the VLAN identifier associated with the node 29 with the MAC address "i" is "Vb") to the switching hub 12 which requires modification of the contents of its address table.

On receiving the modification notice frame, the switching hub 12 checks the contents of the frame and searches its address table for the corresponding entry. Then, the switching hub 12 changes the VLAN identifier associated with the MAC address "i" from "Vc" to "Vb", and performs required VLAN setting for the port.

Thus, in this embodiment, when the VLAN identifier of a specific node among the nodes recorded in the VLAN server is changed, the corresponding part in the address table of the switching hub is modified in accordance with the change. This permits centralized management of logical LAN configuration, and also the VLAN identifier setting of a specific node can be easily modified without the need to take account of the information about the wiring between the port of the switching hub and the node. This embodiment can therefore facilitate the management of a network constituted by VLANs and can provide a very useful VLAN system.

In the foregoing embodiments, each switching hub stores MAC addresses and VLAN identifiers associated therewith. Therefore, where the switching hub is designed so as to compare the VLAN identifier of the source address in a frame with that of the destination address in the same frame and to transfer the frame only when the two coincide, excellent isolation of VLANs from one another is ensured. Especially in the case where security of individual VLANs is a matter of importance, such a switching hub may be employed to construct a high-security VLAN system.

Also, in the above embodiments, VLANs are managed by means of MAC addresses, and thus it is possible to manage VLANs without relying upon network protocols.

Although the embodiments described above use frames including a specific UDP port number of TCP/IP, the frames to be used in this invention are not particularly limited and may be a get frame (inquiry frame/response frame), set frame (modification notice frame) and trap frame (learn-modify frame) based on SNMP (Simple Network Management Protocol) which also is a popular standard, for example.

Figure 17:
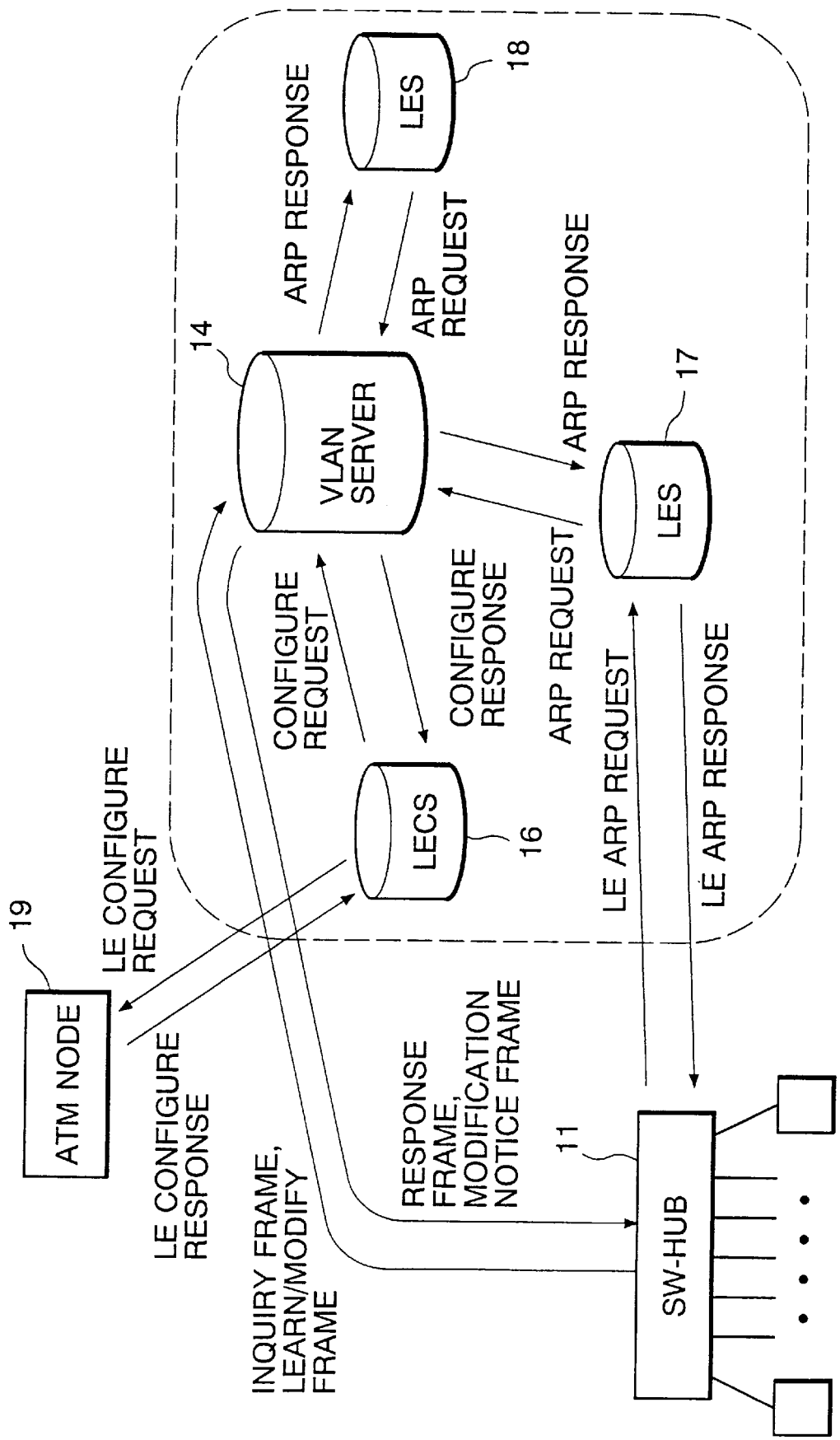
FIG. 17 is a diagram illustrating the relationship of the VLAN server with an LECS and LESs for LAN Emulation according to still another embodiment of this invention.

FIG. 17 shows the relationship of the VLAN server 14 with an LECS and LESs for LAN Emulation according to another embodiment.

In this embodiment, the VLAN server has a table which stores MAC addresses, ATM addresses of switching hubs, port numbers and VLAN identifiers (ELAN names) and which are identical in arrangement with data tables that ordinary LECS and LES have.

It is assumed in the embodiment shown in FIG. 17 that an LECS 16 and LESs 17 and 18 have no data table, and that the VLAN server manages all the information about the MAC addresses, the switching hub ATM addresses, and the VLAN identifiers.

When supplied with an "LE_ARP_REQUEST" inquiring about an ATM address from the switching hub 11, for example, the LES 17 outputs an inquiry "ARP_REQUEST" to the VLAN server 14 and acquires the ATM address from the VLAN server 14. Then, the LES 17 sends a response "LE_ARP_RESPONSE" including the ATM address to the switching hub 11 which originated the request. A similar operation takes place also in response to an "LE_CONFIGURE_REQUEST" sent from the ATM node 19 to the LECS 16.

Thus, in this embodiment, the VLAN server alone has a common database and can comply with data retrieval requested by the LECS or LES. Accordingly, consistency of data can be preserved with ease, compared with the case where a plurality of databases exist independently of one another, and the system can be reduced in scale, facilitating the system management and reducing the manufacturing cost.

Alternatively, a system configuration may be employed such that no VLAN server is provided and all data is transferred between switching hubs, for example. Also in this case, advantages similar to those mentioned above can be achieved.

In the foregoing embodiments is employed the ATM network, but this invention is not particularly limited in this regard and can be applied to construction of virtual LANs via an ISDN, for example. In this case, each of the switching hub identifiers is a telephone number.

What is claimed is:

1. A method of managing virtual networks in which nodes are connected to at least one of a plurality of connecting devices having a plurality of ports and having a bridging function, and in which each node is coupled to at least one of the plurality of ports, and in which the nodes are coupled to a backbone network via the connecting devices, the method comprising the steps of:

forming groups of virtual networks selected from nodes coupled to any of the plurality of correcting devices and other nodes coupled to at least one of the backbone network and a branch line of the backbone network;

connecting to the backbone network or the branch line thereof, a data storing device which stores MAC addresses of the nodes coupled to respective ports of the plurality of connecting devices, and which stores virtual network identifiers indicative of the groups of virtual networks; and sending, from one of the plurality of connecting devices to the data storing device, a frame including a MAC address of a node connected to one port of another one of the plurality of connecting devices, to thereby request a virtual network identifier corresponding to the node of the another connecting device and set a group of virtual networks for the one port connected to the node in accordance with the virtual network identifier provided by the data storing device.

2. The method of managing virtual networks according to claim 1, wherein each of said connecting devices comprises a switching hub having a preset switching hub identifier distinguishable from those of other switching hubs and having preset port numbers associated with respective ports thereof, each of the switching hubs having a table for storing the MAC addresses of the nodes, the port numbers of the ports to which the nodes are connected, and the virtual network identifiers in association with one another, each of the switching hubs performing data transfer in accordance with contents of the table, and modifying the contents of the table in accordance with the virtual network identifier responded from the data storing means.

3. The method of managing virtual networks according to claim 2, wherein when the virtual network identifier of a predetermined node is unknown, the switching hub searches the table for a virtual network identifier associated with a destination MAC address in a frame transmitted from the predetermined node, and learns the virtual network identifier of the predetermined node.

4. The method of managing virtual networks according to claim 3, wherein when a modification notice frame is received, the switching hub changes the virtual network identifier associated with a corresponding one of the MAC addresses in the table.

5. The method of managing virtual networks according to claim 2, wherein when the virtual network identifier of a predetermined node is unknown, the switching hub searches the table for a virtual network identifier associated with a source MAC address in a frame transmitted to the predetermined node, and learns the virtual network identifier of the predetermined node.

6. The method of managing virtual networks according to claim 5, wherein when a modification notice frame is received, the switching hub changes the virtual network identifier associated with a corresponding one of the MAC addresses in the table.

7. The method of managing virtual networks according to claim 2, wherein when the modification notice frame is received, the switching hub changes the virtual network identifier associated with a corresponding one of the MAC addresses in the table.

8. The method of managing virtual networks according to claim 1, wherein said backbone network is an ATM network connected to the connecting devices by means of LAN Emulation according to ATM Forum, emulated LANs configured by the LAN Emulation according to the ATM Forum being used as virtual networks on the ATM network.

9. The method of managing virtual networks according to claim 8, wherein said ATM network includes a LAN Emulation server and a LAN Emulation configuration server for LAN Emulation, the LAN Emulation server and the LAN Emulation configuration server sharing a database of said data storing means.

10. The method of managing virtual networks according to claim 1, wherein said backbone network is an ATM network connected to the connecting devices by means of LAN Emulation according to ATM Forum, emulated LANs configured by the LAN Emulation according to the ATM Forum being used as virtual networks on the ATM network, and said data storing means comprises a virtual network server and stores the MAC addresses of the nodes, the virtual network identifiers, switching hub identifiers of switching hubs to which the nodes are connected, and port numbers of the switching hubs in association with one another.

11. The method of managing virtual networks according to claim 10, wherein said virtual network server changes a virtual network identifier associated with a specific one of the stored MAC addresses in accordance with a predetermined modification command, and transmits a modification notice frame indicative of the change of the virtual network identifier to related ones of the connecting devices.

12. The method of managing virtual networks according to claim 10, wherein said ATM network includes a LAN Emulation server and a LAN Emulation configuration server for LAN Emulation, the LAN Emulation server and the LAN Emulation configuration server sharing a database of a virtual network server, the virtual network server complying with data retrievals requested by the LAN Emulation server and the LAN Emulation configuration server.

13. The method of managing virtual networks according to claim 1, wherein said data storing means comprises a virtual network server and stores the MAC addresses of the nodes, the virtual network identifiers, switching hub identifiers of switching hubs to which the nodes are connected, and port numbers of the switching hubs in association with one another.

14. The method of managing virtual networks according to claim 1, wherein said backbone network is an ATM network.

* * * * *